June 8, 1926.
G. DUCH
1,587,707
THERMOELECTRIC BATTERY
Filed April 24, 1925    2 Sheets-Sheet 1
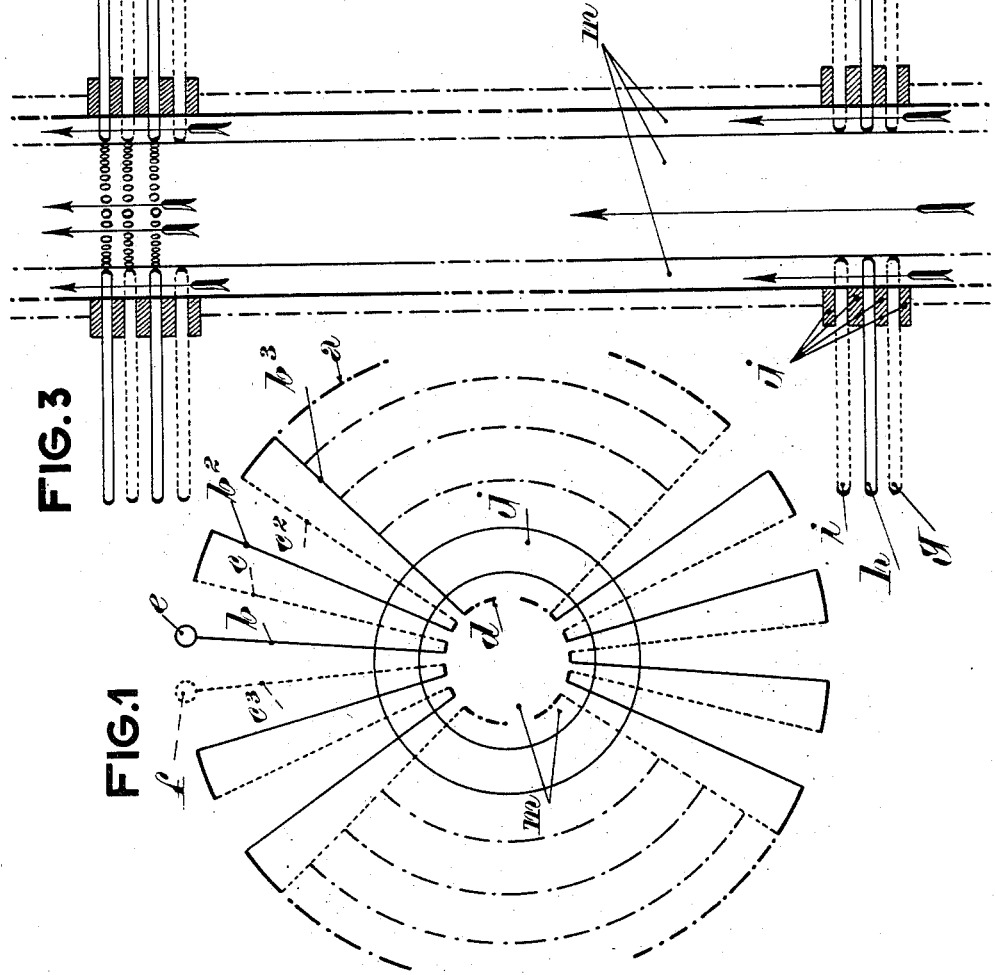

June 8, 1926.
G. DUCH
1,587,707
THERMOELECTRIC BATTERY
Filed April 24, 1925      2 Sheets-Sheet 2
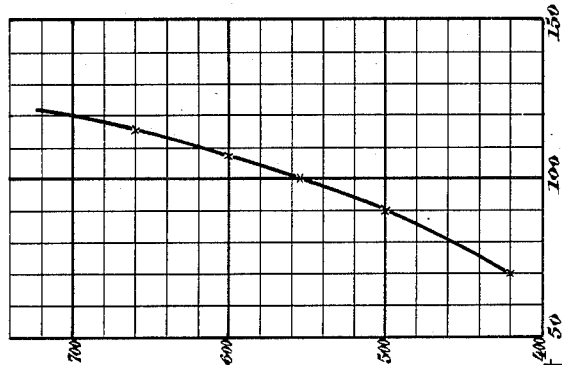
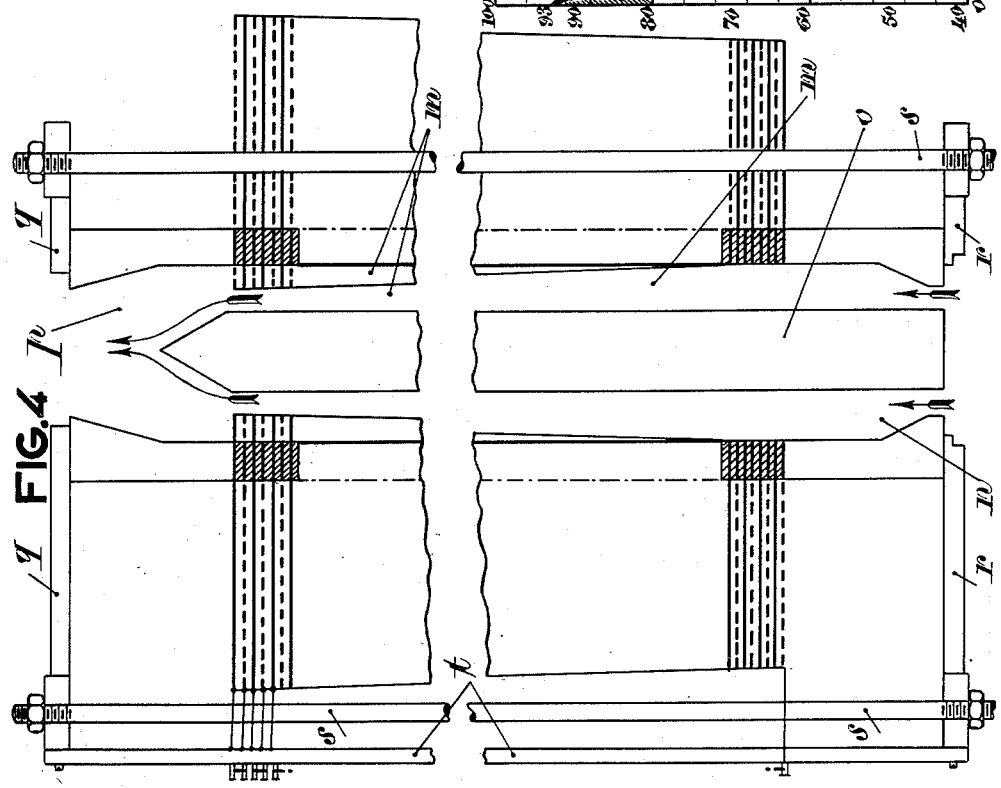

Patented June 8, 1926.

1,587,707

UNITED STATES PATENT OFFICE.

GABRIEL DUCH, OF LYON, FRANCE.

THERMOELECTRIC BATTERY.

Application filed April 24, 1925, Serial No. 25,541, and in France June 20, 1924.

The present invention relates to a thermoelectric battery adapted to absorb the heat contained in hot gases and of transforming a part thereof into electricity. The battery is more particularly adapted for use with wireless telegraphy apparatus in place of the usual heavy and cumbersome accumulators. Thus low tension batteries of light weight and small size can be constructed and used, for example, for heating the filaments of thermionic valves used in wireless telegraphy and high tension batteries for use in feeding plates of such valves.

The annexed drawing illustrates an example of construction of the invention.

Fig. 1 is a diagrammatic plan view of an element of the battery,

Fig. 2 is a diagrammatic view in elevation showing the connections between a series of elements, Fig. 3 is a diagrammatic view in vertical section of a battery without its casing, Fig. 4 is a diagrammatic view in vertical section of a battery provided with its various accessories, Fig. 5 is a graph illustrating the variations of the electromotive force of a battery in function of the internal mean temperature of the hot elements.

Fig. 6 is a graph illustrating the variations of the differences of potential at the terminals of the battery.

The battery is constructed at follows:—

Along radii of a circle $a$ shown in dotted lines in Fig. 1 alternating with one another are a series of rectilinear wires $b$ $c$ constructed of two thermo-electric metals and arranged in such a way that for each wire one of the ends bears on the circle $a$ and the other on the circle $d$ concentric with the circle $a$. The wires $b$ are shown in full lines and the wires $c$ in dotted lines.

The ends of the wires bearing on the circle $a$ are soldered or connected in pairs, the end of wire $c$ with that of $b^2$ that of $c^2$ with that of $b^3$ and so on; it is the same for the wire ends bearing on the circle $d$, the extremity of wire $b$ is soldered to the end of wire $c$, the end of wire $b^2$ with that of $c^2$ and so on. Thus all these couples are associated electrically in series.

On the circle $a$ are the wire ends $b$ and $c^3$ which are free and provided with terminals $e$ $f$.

A series of these wire crowns or rings $g$ $h$ $i$ etc. so formed (Fig. 3) are employed and separated by concentric washers $j$ made of amianthus or other heat insulating substance $j$ in such a way that the connections situated on the circle $a$ extend beyond the said washers for a greater length than the connections situated on the circle $d$.

In order to nullify the effect of self-induction in the whole, the crowns or rings in equal number are arranged face to face in such a way that the terminals corresponding to the different metals lie one above the other, respectively, the terminal $f$ below the terminal $e^2$ etc. These terminals are connected in pairs $f$ with $e^2$, $f^2$ with $e^3$ etc. The remaining terminals $e$ and $f^4$ constitute the terminals of the battery.

The whole forms as it were a heat conduit comprising interior and exterior thermoelectric couples. If hot gases are passed through the axial conduit $m$ the couples operate to cool these gases and transmit the calorific energy produced, while transforming it partially into electric energy available at the poles. The gases circulate in the cylinder $m$ formed by the superposed amianthus washers and also in the free spaces in the wire ring elements.

It is to be remarked that by connecting or soldering the terminals of the rings or crowns in parallel instead of in series, relatively high intensity can be induced with feeble electro-motive forces. Various combinations of parallel series of connections of the crowns are possible according to the use to which the apparatus is to be put.

Further, air can enter between the amianthus washers and the wires of the rings and operates to complete the combustion of the gases if the latter is not complete and at the same time contributes to the cooling of the exterior wire connections.

Fig. 4 shows a battery formed of the superposed crowns or rings; at the base of the axial conduit $m$ is a combustion chamber $n$ in the form of a divergent cone and constructed of amianthus; in the axis of this conduit is a cylinder $o$ of low heat conductivity and of low specific heat and intended to drive back the hot gases towards the crowns and to act by radiation on the hot surface. The gases escape through the divergent cone $p$.

Two triangular plates $q$ and $r$ connected by three rods $s$ set at 120° to one another and provided with nuts squeeze the whole together.

The hot gases can be produced either by an annular gas nozzle or by a heater burning spirit under pressure or by any other source of heat particularly if it is electric.

The cooling of the cold solder is assured by the heat emission and by convection by means of currents of air, which circulate from top to bottom in the vertical channels having a section in the form of a sector of an annulus generated by the conductors constituting the crowns.

The apparatus represented in Fig. 4 comprises a plate $t$ carrying terminals in electric communication with the terminals of the crowns and allowing for all combinations in series or in parallel of the crowns of the battery.

The metals employed may be either iron and constantan, or constantan and silver manganese alloy or wire drawn thermoelectric metals such as are used particularly in the manufacture of pyrometers.

Further the hot gases necessary for the functioning of the apparatus could be provided by the exhaust from the internal combustion engine of a motor car, aeroplane or the like or from any other source of heat.

The apparatus acts on the principle of cooling flames by metallic fabrics; the wire couples extending into the axial channel of the apparatus absorb the heat from the hot gases passing through said channel and transmit it to the outside medium.

The employment of wires or ribbons to form the couples allow of arranging a great quantity on a surface of determined dimensions.

The variations of the electromotive force of the battery in function of the mean internal temperature of the heated elements is indicated in Fig. 5. The curve represents these variations.

The electromotive force expressed in volts is indicated by the abscissas and the mean temperature in degrees centigrade by the ordinates.

The variations of the difference of potential at the terminals of the battery are shown by the curve $u$ in Fig. 6; the abscissas indicate the intensities in milliamperes, and the ordinates the differences of potential in volts. The curve $v$ indicates the difference in a battery of lesser size. The cross hatched parts of the plane of the co-ordinates indicate the area of use of these large and smaller batteries as applied to thermionic valves (of the French type) and volts to 80 volts.

What I claim as my invention and desire to secure by Letters Patent of the United States is:—

A thermo-electric battery comprising a series of superposed elements each constructed of wires or ribbons formed of two thermo-electric metals arranged radially and alternately and connected so as to form a flat annular structure having gaps in the continuity of its inner and outer periphery, terminals on each of said elements, annular washers arranged constructed of heat insulating material between individual elements of said series and concentrically therewith said washers having such internal and external diameters that the inner peripheries of said elements lie slightly within the inner peripheries of said washers and the outer peripheries of said elements project considerably beyond the outer peripheries of said washers, means electrically connecting the respective terminals of the elements, a tapered tubular combustion chamber lying within the inner peripheries of said washers and elements, a cylindrical member of low heat conductivity within said combustion chamber and means connecting said elements and washers to form a rigid structure.

In witness whereof I have signed this specification.

GABRIEL DUCH